(12) United States Patent
Schmid

(10) Patent No.: US 9,438,078 B2
(45) Date of Patent: Sep. 6, 2016

(54) ARRANGEMENT OF COIL WIRES IN A ROTOR OF AN ELECTRIC MOTOR

(71) Applicant: Nidec Motors & Actuators (Germany) GmbH, Bietigheim-Bissingen (DE)

(72) Inventor: Juergen Schmid, Lauffen (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 403 days.

(21) Appl. No.: 13/930,370

(22) Filed: Jun. 28, 2013

(65) Prior Publication Data

US 2014/0009029 A1  Jan. 9, 2014

(30) Foreign Application Priority Data

Jun. 29, 2012 (GB) .................................. 1211566.3

(51) Int. Cl.
| | |
|---|---|
| *H02K 1/14* | (2006.01) |
| *H02K 3/12* | (2006.01) |
| *H02K 13/04* | (2006.01) |
| *H02K 15/00* | (2006.01) |

(52) U.S. Cl.
CPC ............... *H02K 3/12* (2013.01); *H02K 13/04* (2013.01); *H02K 15/0031* (2013.01); *Y10T 29/49009* (2015.01)

(58) Field of Classification Search
CPC .......... H02K 1/148; H02K 1/16; H02K 1/18; H02K 16/02
USPC .................................. 310/216.069–216.073
See application file for complete search history.

(56) References Cited

U.S. PATENT DOCUMENTS

| | | | |
|---|---|---|---|
| 6,952,069 B2 | 10/2005 | Akatsu et al. | |
| 2001/0011851 A1 | 8/2001 | Asao et al. | |

FOREIGN PATENT DOCUMENTS

| | | |
|---|---|---|
| EP | 0 077 076 A | 4/1983 |
| EP | 1490950 | 12/2004 |
| FR | 2786334 | 5/2000 |
| GB | 922929 | 4/1963 |
| GB | 2282481 | 4/1995 |
| GB | 2343998 | 10/2000 |
| GB | 239119 | 1/2004 |
| JP | 2000166152 | 6/2000 |
| JP | 2003299329 | 3/2005 |
| JP | 2008-259322 | 10/2008 |
| WO | 03084033 | 10/2003 |

*Primary Examiner* — Tran Nguyen
(74) *Attorney, Agent, or Firm* — Cantor Colburn LLP

(57) ABSTRACT

An armature for an electric motor, the armature comprising a plurality of teeth and a plurality of cavities, wherein each one of the cavities is arranged between two of the plurality of teeth, and wherein at least one of the plurality of cavities is configured and arranged for receiving coil windings adjacent to a wall portion of the at least one cavity, wherein the at least one of the plurality of cavities comprises a switching wire receptor.

12 Claims, 4 Drawing Sheets

ARRANGEMENT OF COIL WIRES IN A ROTOR OF AN ELECTRIC MOTOR

BACKGROUND OF THE INVENTION

1. Field of the Invention

The present disclosure relates to electric motors. The present disclosure relates in particular to armatures for electric motors and to the arrangement of switching wires and of coil wires on the armature.

2. Brief Description of the Related Art

Armatures of brushed electric motors comprise coils wound around the teeth of the armature for providing the required magnetization of the teeth of the armature. Magnetisation of the teeth is done by applying an electric current through the coil. The coils are electrically contacted via brushes and a commutator in a general known manner. While an electric motor has at least two coils and two teeth, modern electric motors have a plurality of teeth such as for example four or more teeth. A coil is wound around each tooth or a plurality of teeth and individually addressed via the commutator.

While the armature may be seen as having a plurality of teeth arranged around the shaft, the armature can also be considered as having a plurality of cavities arranged between the teeth of the armature. Besides the coil wires, so called switching wires are arranged in the cavities between the teeth. The switching wires are used to connect the coils with the commutator and to electrically equalize single bars of the commutator. The arrangement of the coil wires and the switching wires with respect to each other depends on the manufacturing method or sequence. The arrangement of the switching wire and the coil is different depending on whether the switching wire is placed prior to or after the arrangement of the coil. This has the disadvantage that the position of the coil wires and the coil cannot be determined precisely and manufacturing sequence has to be considered. If the manufacturing sequence was not considered, in some cavities the switching wires will be arranged at the positions where coils are supposed to be arranged, so it is difficult to wind coils on teeth orderly, which will have several negative effects like uncontrolled wire crossings, increased end turn height, unbalance and efficiency degradation of motor.

It is an object of the present invention to overcome the disadvantages of prior art.

SUMMARY OF THE INVENTION

The present invention suggests an armature for electric motor, an electric motor with such an armature, and a method for the manufacture thereof The armature comprises a plurality of teeth and a plurality of cavities or slots. Each one of the cavities is arranged in the outer circumferential surface. The cavities are arranged between two of the plurality of teeth, thus forming the armature. At least one of the plurality of cavities is configured and arranged for receiving coil windings adjacent to a wall portion of the at least one cavity/tooth. The wall portion may be a wall of one of the plurality of teeth. At least one of the plurality of cavities comprises a switching wire receptor. The wire receptor is formed by a recess for receiving a switching wire or a plurality of wires.

The switching wire receptor in the cavity or between the teeth may be used to place, guide and/or support the switching wire in a predetermined position. This allows placing the switching wires as well as the coil wires more precisely which reduces unbalanced mass of the armature and manufacturing of the coils and the armature is made easier. It is also possible to construct coils and armatures without crossing wires as the switching wires are arranged separately in the switching wire receptor which allows reducing the size, i.e. the radius of the armature. The invention helps in designing smaller and more lightweight motors.

The switching wire receptor may have the form of a recess or groove in a wall portion of the cavity. The recess may be formed in the radial innermost surface or at the bottom of the cavity. The recess may be large enough to take up one or a plurality of switching wires and to keep the switching wires in place. The cross section of the recess or groove may thus be in the same order of magnitude as the diameter of the switching wire or a plurality of switching wires.

The switching wire receptor may also have a different shape, such as for example a clamp or a wire holder placed in the cavity.

The switching wire receptor may have a guiding surface for maintaining and supporting the switching wire in a circumferential direction. One or two recesses may be provided and two switching wires may be arranged in one switching wire receptor together or separate switching wire receptors may be provided for each switching wire.

The present disclosure also relates to a method for manufacturing a rotor or armature for an electric motor. The method comprises arranging electrical wires on an armature of an electric motor. The method comprises placing at least one switching wire in a switching wire receptor arranged in a cavity of the armature. The cavity is formed between two teeth of the armature. The method further comprises winding coil wires on a coil guiding surface of the at least one cavity. The coil guiding surface may be a wall portion of the cavity and may be formed by one of the plurality of teeth.

The placing of the at least one switching wire in the switching wire receptor arranged in the cavity of the armature may be performed prior to or after the winding the coil wires on the coil guiding surface of the at least one cavity. The final position of the coil wires remains the same in both cases, i.e. the order of manufacturing has no influence on the position of the coil wires on the teeth and in the cavities, which makes coils formed with the coil wires wound orderly on the teeth. And orderly wound coil wires can reduce the resistance of the coils, which improves the efficiency of the motor.

The placing of the at least one switching wire and the winding can be done in any sequence without changing the outcome. The placing of the at least one switching wire may be done prior to the winding of the coil of coil wires in a first cavity and the placing of the at least one switching wire is done prior or subsequently to the winding the coil of coil wires in a first cavity.

BRIEF DESCRIPTION OF THE DRAWINGS

The invention may be better understood when reading the following detailed description that is given with respect to the Figs. in which.

DETAILED DESCRIPTION

Examples of the present disclosure are now described in more detail. It is to be noted that not all features of these examples need to be implemented to carry out the invention and that a person skilled in the art will modify, add or omit features depending on the application of the armature and the electric motor.

Figure 1:
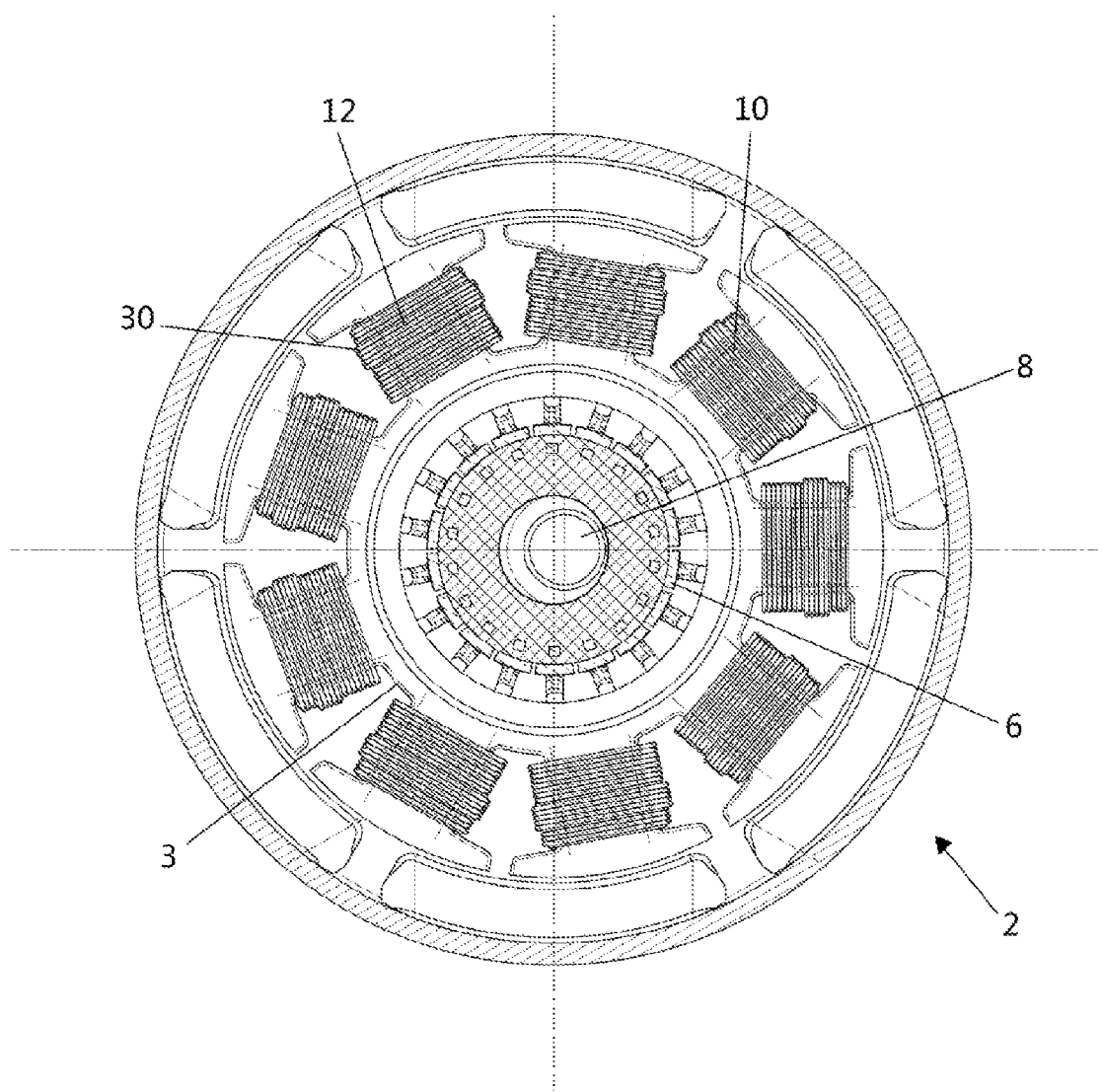
FIG. 1 shows the cross section of a conventional electric motor with an armature.

FIG. 1 shows an electric motor 2 in which the present invention may be implemented. The electric motor may be a conventional electric motor and comprises a rotor 3 with an armature 10 arranged on a rotating shaft 8. A commutator 6 with a plurality of contact elements also placed on the rotating shaft 8 in a usual manner. The armature 10 comprises a plurality of teeth 12 that are arranged around the rotational axis of the shaft 8. The teeth 12 may have a mushroom like shape and may be made from a magnetisable material as known in the art. All parts of the electric motor that are not specifically mentioned herein may be as in any electric motor known in the art.

Figure 2:
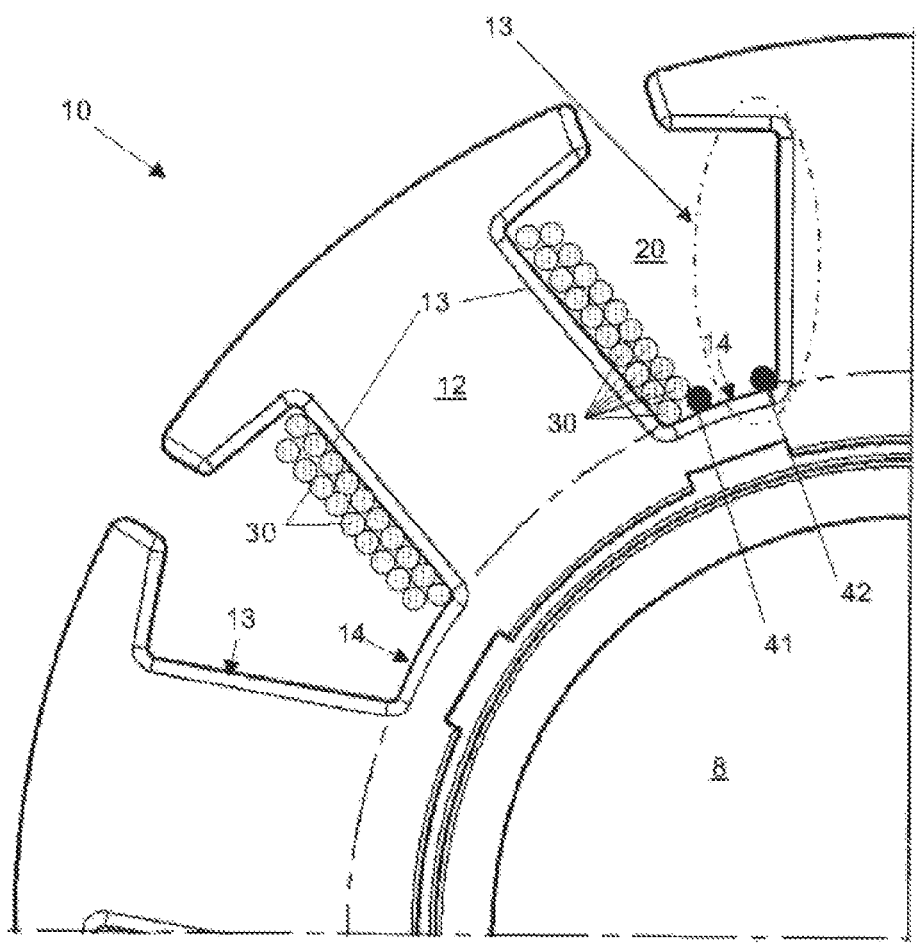
FIG. 2 shows a portion of a cross section of the conventional armature.

FIG. 2 shows a portion of a cross section of the conventional armature. At least one coil of coil wires 30 is wound around each tooth 12 for magnetising the magnetisable material of the teeth 12. The coil may be wound directly on the coated teeth 12, or the coil may be wound on an insulator, which is arranged on the surface of the teeth 12. Each tooth 12 has two substantial parallel guiding wall portions 13 for winding the coil wires (As shown in FIG. 2). These guiding wall portions 13 also form a wall portion of the cavities arranged on both sides of the teeth 12 in the circumferential direction. The cavities further include a radial innermost wall portion 14 arranged between the guiding wall portions 13 and extending in the circumferential direction. The coil wires 30 are connected by switching wires 41, 42 to selected contacts of the commutator to magnetize the corresponding tooth in a predetermined manner during rotation of the rotor 3.

The switching wires 41, 42 may be terminal end portions of the coil wires 30 and may be made from the same material as the coil wires. The switching wires 41, 42 may have the same or a different diameter of cross section compared to the coil wires 30

The switching wires 41, 42 are also arranged somewhere in the cavities 24 between two teeth 12 as show in FIG. 2. The position of the switching wires 41, 42 in the cavity will depend on the order or sequence of the manufacturing steps. If the coil wires 30 are wound around the tooth 12 prior to placing the switching wire 41, the switching wire 41 is arranged on top of the coil wires as shown on the left hand side of FIG. 2. If the switching wire 42 is placed in the cavity prior to winding the coil wires 30, the switching wire 42 is placed differently. In this case the switching wire 42 is arranged directly at the guiding wall portion 13 of the cavity 20 and the coil wires 30 are wound on top of the switching wire 42 (not shown). This arrangement of the switching wire 42 is shown on the right hand side of cavity 20 in FIG. 2.

The position of the switching wire 41, 42 and consequently the position of the coil wires 30 depends on the sequence in manufacturing, i.e. if the switching wire 41, 42 is placed prior to or after winding the coil wires. The manufacturing sequence has to be considered in manufacturing making manufacturing of the armature complex. If the manufacturing sequence was not considered, in some cavities 24 the switching wires 42 will be arranged at the positions where coils are supposed to be arranged, so it is difficult to wind coils on teeth 12 orderly, which will have several negative effects like uncontrolled wire crossings, increased end turn height, unbalance and efficiency degradation of motor. And even the manufacturing sequence is considered, it is also difficult to wind coils on teeth 12 orderly because the switching wires 41, 42 can move easily, especially when the rotor 3 is rotating. And disorderly wound coil wires 30 will increase the resistance of the coils and reduce the efficiency of the motor.

Figure 3:
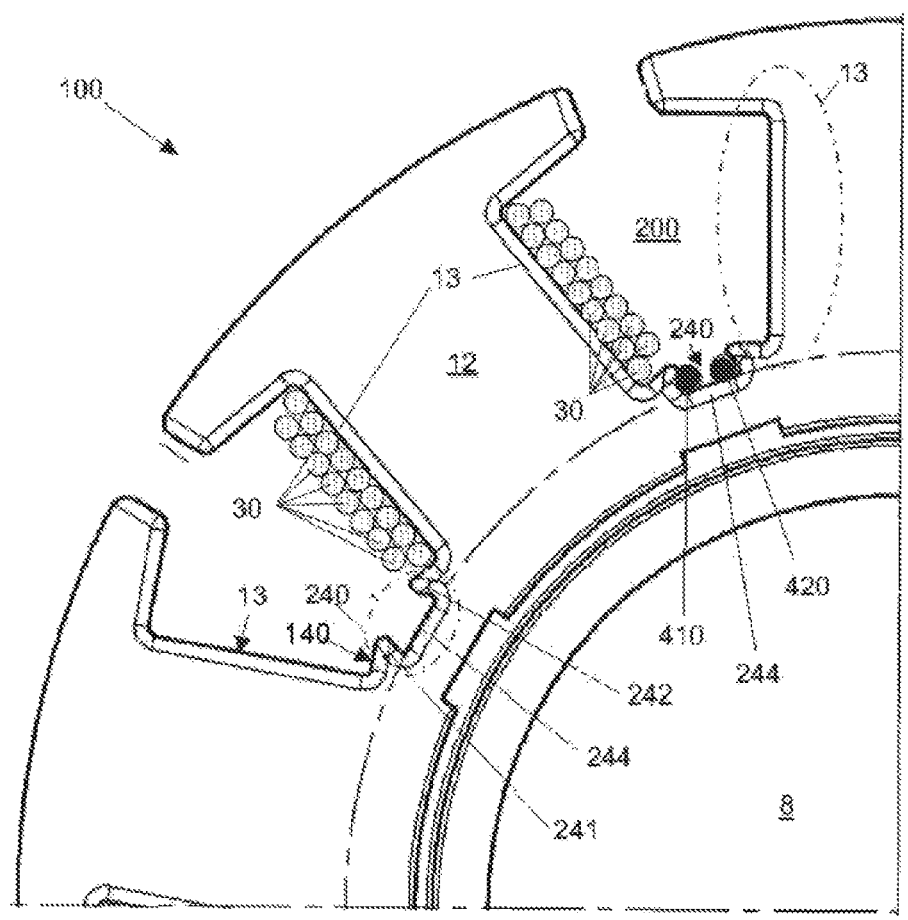
FIG. 3 shows the same portion of a cross section of an armature according to the first embodiment of the present invention.

FIG. 3 shows the same section of an armature 100 as FIG. 2 for armature 10. In contrast to the armature 10 of FIG. 2, the armature 100 of FIG. 3 provides a groove or recess 240 as a switching wire receptor at the radially innermost wall portion 140 of the cavity or slot 200. The groove or recess 240 may have the form of channels in which switching wires 410 and 420 are positioned, guided and maintained in place. The recess 240 is arranged at the radial innermost wall portion 140 so that the space to wind coils 30 will not be affected. The switching wires 410 and 420 are thus well separated from the coil wires 30 and can be placed in the groove or recess 240 prior or after winding the coil 30 around the teeth 12. The switching wires 410 and 420 and the coil wire 30 are always placed in the same position, independent of the manufacturing sequence. This enables a more precise arrangement of the coil wire 30 and of the switching wires 410 and 420 and the manufacturing process can be made more flexible. The armature 100 can be designed more compact and a smaller diameter of the armature may be achieved leading to smaller and more lightweight motors. The magnetic field in the teeth 12 can be generated more precisely and the unbalanced mass flyweight of the armature 10 can be reduced. Furthermore, coil wires can be wound around teeth orderly, which can reduce the resistance of the coils and improve the efficiency of the motor.

The recess 240 has a depth corresponding to the diameter of the switching wires 410 and 420. The recess 240 may have a depth larger than the diameter of the switching wires 410 and 420, or at least larger than half of the diameter of the switching wires 410 and 420. The recess 240 with a depth corresponding to or larger than the diameter of the switching wires 410 and 420 can make sure the switching wires 410 and 420 hold in the recess 240. The cross sectional shape of the recess may comprise a bottom portion 244 and a first wall portion 241 and a second wall portion 242. The first wall portion 241 and a second wall portion 242 may provide a support for the switching wire 410 and 420, respectively in the circumferential direction of the armature. This enables a precise and stable positioning of the first switching wire 410 against the first wall portion 241 and of the second switching wire 420 against the second wall portion 242. The recess 240 may have a width between the first wall portion 241 and the second wall portion 242 that is sufficient take up two switching wires 410 and 420.

The first wall 241 and the second wall 242 may be arranged substantially perpendicular to the bottom portion 244 resulting in a rectangular cross section of the recess 240. It is advantageous to provide a tapered cross section of the recess 240 as shown in FIG. 3. The width of the recess may be smaller at the top side which is open to the cavity compared to the bottom portion. This allow to clamp and better support 5 the switching wire 410, 420 in the corner formed by the bottom portion 244 and the respective wall 241, 242.

While in the example shown in FIG. 3, one recess 240 is used for both switching wires 410, 420, it is also possible to provide a separate recess for each switching wire or to place more than two switching wires in a recess if this should be required.

It is also possible to place the recess in a different position in the cavities 200 that in the radially innermost surface.

The cavity 200 and recesses 240 described above can be implemented in any existing armature 10 and existing armatures can be modified.

While the present disclosure shows the recess 240 in a specific armature 10, it is obvious to a person skilled in the art that other armatures can be used and that the disclosure is not limited to a particular number of teeth 12 or cavities with particular a particular geometry of the armature.

Figure 4:
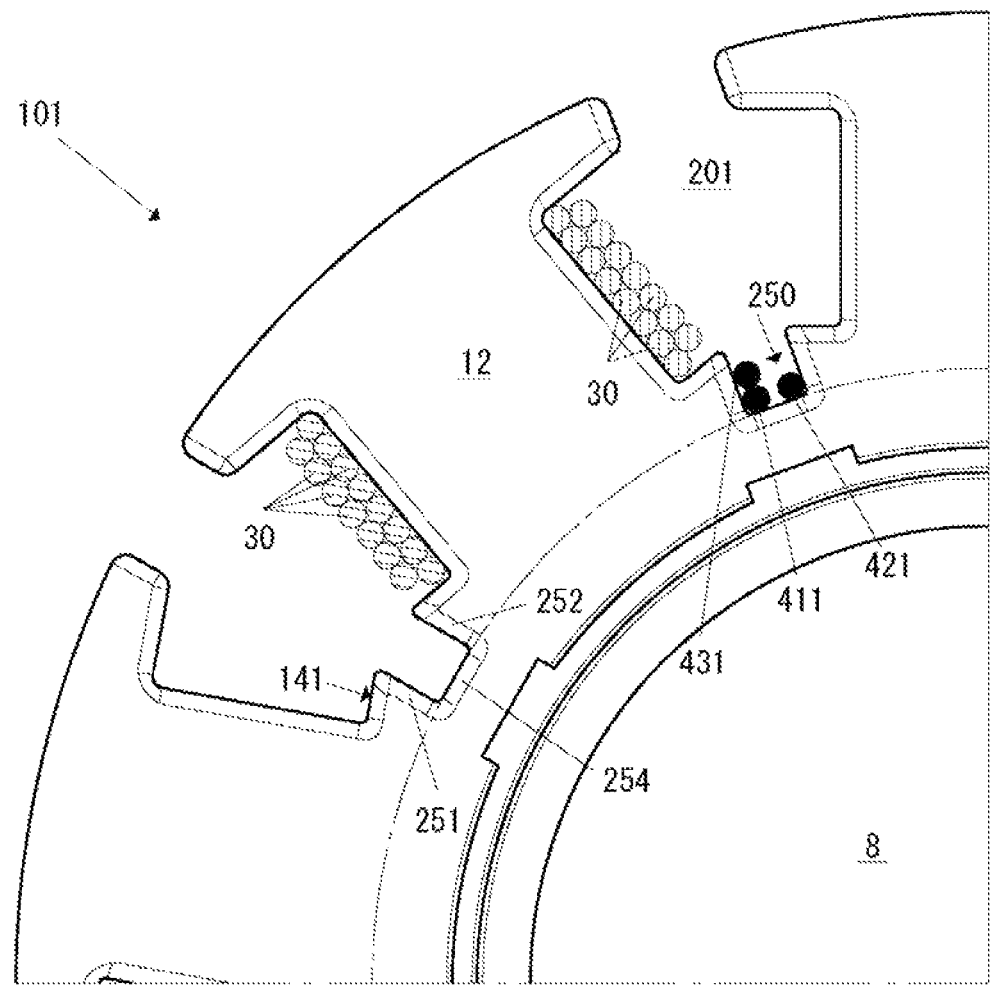
FIG. 4 shows the same portion of a cross section of an armature according to the second embodiment of the present invention.

FIG. 4 shows a partial enlarged view of a cross section of an armature according to the second embodiment of the present invention. In the second embodiment, the recess 250 has a cross section with a different shape compared to the first embodiment.

In the second embodiment, the recess 250 includes a bottom portion 254, a first wall portion 251 and a second wall portion 252. The first wall portion 251 and the second wall portion 252 are arranged substantially parallel to each other, and the first wall portion 251 and the second wall portion 252 are both arranged substantially perpendicular to the bottom portion 254 resulting in a substantially rectangular cross section of the recess 250. The first wall portion 251 and the second wall portion 252 are arranged substantially parallel to each other so the life-span of the casting die to produce the armature is longer.

The distance between the first wall portion 251 and the second wall portion 252 is larger than two times of the diameter of a switching wire 411, and the depth of the recess 250 in the radial direction is larger than two times of the diameter of the switching wire 411. With this shape, the recess 250 is large enough to hold at least four switching wires 411. In the second embodiment, the recess 250 is holding 3 switching wires 411, 421, 431. The size of the recess 250 may be arranged to apply to specific motor to hold switching wires.

A person skilled in the art may modify the armature and adapt it to different rotors and different electric motors. For example, although the preferred embodiments described above are rotor cores of inner rotor type motors, the invention can also be adopt to rotor or stator of outer rotor type motor. The scope of the present invention, therefore, is to be determined solely by the following claims.

The invention claimed is:

1. An armature for an electric motor, the armature comprising:
a plurality of teeth and a plurality of cavities, wherein each one of the cavities is arranged between two of the plurality of teeth, and wherein at least one of the plurality of cavities is configured and arranged for receiving coil windings adjacent to a wall portion of the at least one cavity, wherein the at least one of the plurality of cavities comprises a switching wire receptor;
wherein the switching wire receptor comprises a recess in a wall portion of the at least one of the plurality of cavities for receiving a switching wire; and
wherein the recess has a depth larger than the diameter of the switching wire.

2. The armature of claim 1, wherein the at least one of the plurality of cavities has a radial innermost wall portion and wherein the switching wire receptor is arranged at the radial innermost wall portion.

3. The armature of claim 1, wherein the switching wire receptor has a guiding surface for at least one switching wire.

4. The armature of claim 1, wherein the at least one cavity has two substantially opposite guiding wall portions for coil wires.

5. The armature of claim 4, wherein the two substantially opposite guiding wall portions form a tapered cavity which is tapered towards the radial innermost wall portion.

6. The armature of claim 1, wherein the two substantially opposite wall portions form a tapered receptor which is tapered towards the radial innermost wall portion.

7. The armature of claim 1, wherein the wall portion of the cavity is a first wall portion, and the cavity further comprises a second wall portion substantially parallel and opposite to the first wall portion.

8. The armature of claim 1, wherein the switching wire is a terminal end portion of the coil wire.

9. An electric motor comprising an armature according to claim 1.

10. An armature for an electric motor, the armature comprising:
a plurality of teeth and a plurality of cavities, wherein each one of the cavities is arranged between two of the plurality of teeth, and wherein at least one of the plurality of cavities is configured and arranged for receiving coil windings adjacent to a wall portion of the at least one cavity, wherein the at least one of the plurality of cavities comprises a switching wire receptor;
wherein the switching wire receptor comprises a recess in a wall portion of the at least one of the plurality of cavities for receiving a switching wire; and
wherein the recess has a depth substantially corresponding to the diameter of the switching wire.

11. The armature of claim 1, wherein an insulator is arranged on a surface of the teeth.

12. The armature of claim 10, wherein an insulator is arranged on a surface of the teeth.

* * * * *